United States Patent [19]

Kiuchi et al.

[11] 4,328,066
[45] May 4, 1982

[54] TAPE SPLICING APPARATUS

[75] Inventors: Seiji Kiuchi; Shoji Imai, both of Minami-ashigara, Japan

[73] Assignee: Fuji Photo Film Co., Ltd., Kanagawa, Japan

[21] Appl. No.: 165,811

[22] Filed: Jul. 3, 1980

[30] Foreign Application Priority Data

Jul. 5, 1979 [JP] Japan .................. 54-85398

[51] Int. Cl.³ .................. B31F 5/00; B65H 21/00
[52] U.S. Cl. .................. 156/506; 156/157; 156/304.1
[58] Field of Search .......... 156/157, 304.1, 505, 156/502, 506, 521

[56] References Cited

U.S. PATENT DOCUMENTS 3,227,594  1/1966  Ryan .................. 156/506
3,575,770  4/1971  Policht .................. 156/506
3,841,934 10/1974  Rosborough, Jr. et al. ....... 156/157
4,234,365 11/1980  Shimizu et al. .................. 156/157

Primary Examiner—John E. Kittle
Attorney, Agent, or Firm—Sughrue, Mion, Zinn, Macpeak and Seas

[57] ABSTRACT

A tape splicing apparatus in which two tapes are quickly joined with no air bubbles entrapped by splicing tape. A drum body holds splicing tape by suction pressure applied through holes and the peripheral surface of the drum. The splicing tape is cut into segments of predetermined length upon the drum surface. The drum is then lowered to the splicing position upon stationary and movable receiving stands to press the sticky side of the tape segment against the abutting tape joint. A movable roller presses the splicing tape segment, which was initially attached along only a single line, in forward then rearward directions from the center of the joint so that no air can be entrapped under the splicing tape.

19 Claims, 14 Drawing Figures

TAPE SPLICING APPARATUS

BACKGROUND OF THE INVENTION

The present invention relates to tape splicing apparatuses. More particularly, the invention relates to a tape butt-joining apparatus.

The term "tape" as herein used is intended to mean relatively thin flexible belt-shaped materials, for instance 2-250 μm, of small in width, for instance 3-55 mm, such as plastic films made of polyesters such as polyethyleneterephthalate, polyethylene-2 and 6-naphthalate, polyolefins such as for instance polypropylene, cellulose derivatives such as cellulosetriacetate and cellulosediacetate, or polycarbonate; or metal sheets of copper, aluminum, zinc, etc.; or paper such as baryta paper or synthetic paper. Furthermore, the term "tape" includes the above-described flexible belt-shaped materials on which magnetic recording layers, photosensitive layers, colored layers, or the like are formed by coating. Examples of such flexible belt-shaped materials are magnetic recording media such as magnetic tapes, photographing photosensitive materials such as motion picture films, and leader tapes which are transparent or semi-transparent and are connected to the ends of magnetic tapes or photographing films.

The tape described above is shipped or used after it has been wound to a predetermined length on a winding core member which is suitably designed according to the specific intended use or the tape is wound on one of the two winding core members to which both its ends have been attached.

Heretofore, in the process of winding the tape on a winding core member to produce a tape roll having a predetermined length, when the tape of a first stock tape roll from which the tape is being supplied has run out, a second stock tape roll is provided to continue to supply the tape. The ends of the present and preceding tapes must accordingly be joined together with splicing tape or the like to produce a tape roll of the desired length. Also, it may be desired to join tapes of different characteristics such as a magnetic tape and a leader tape to produce a tape roll having a predetermined desired length.

In the above-described tape roll forming or manufacturing process, a method in which the tapes are butt-joined is preferable to a method in which the tapes are joined with the end portions thereof overlapped so that higher tape running speeds may be used in tape utilizing equipment such as magnetic recording and reproducing devices, cameras, developing devices or projectors. A variety of tape butt-joining methods and apparatus have been proposed in the art. A typical example of a conventional tape butt-joining apparatus is shown in FIG. 1. First and second movable tape receiving stands 4 and 5 having guide grooves are arranged radially on the front surface of a rocking supporting plate 3 which is in the form of a sector and is rockable around its supporting shaft 2. The receiving stands 4 and 5 are alternately brought into alignment with a stationary tape receiving stand 1 with a guide groove by rocking the plate 3 so that tapes retained by suction in the guide grooves of the receiving stands 1, 4 and 5 are butt-joined.

The operations of various members of the conventional apparatus will be described in more detail. First, the first movable receiving stand 4 is aligned with the stationary receiving stand 1 by swinging the rocking supporting plate 3. A first tape $T_1$ which is supplied from a stock roll (not shown) positioned upstream of the first movable receiving stand 4 is continuously delivered in the direction of the arrow A through the first movable receiving stand 4 and the stationary receiving stand 1 to a winding section (not shown) located downstream of the stationary receiving stand 1. If the stock roll of the first tape $T_1$ runs out before the length of the tape wound reaches a predetermined value, the tape $T_1$ is retained by suction on the bottoms of the guide grooves the first movable receiving stand 4 and the stationary receiving stand 1 and the tape $T_1$ is cut by moving a tape cutting knife 6 along a small gap C between the receiving stands 4 and 1. Thereafter, the second movable receiving stand 5, which retains by suction on the bottom of its guide groove a second tape $T_2$ drawn from a stock roll, is aligned with the stationary receiving stand 1 by swinging the rocking supporting plate 3 so that the first and second tapes $T_1$ and $T_2$ are in abutment with each other over the gap C without overlapping each other. Thereafter, a splicing tape $T_3$ provided above the butt joint in advance is bonded to the butt-joint region of the tapes $T_1$ and $T_2$ and then the second tape $T_2$ is wound upon the first tape $T_1$.

In another example of a conventional tape splicing apparatus, the first and second movable receiving stands 4 and 5 are arranged parallel to one another in the same plane and the receiving stands 4 and 5 are moved back and forth with respect to the stationary receiving stand 1 whereby the first and second tapes $T_1$ and $T_2$ switched over.

Recently, the operating speed of tape processing equipment has been increased and accordingly the tape guide mechanisms in recently designed equipment have become more intricate. Commensurate with this development, the tape should be capable of running at higher speeds. However, it is difficult for tape spliced using a conventional tape splicing apparatus to meet this requirement due to several drawbacks. Namely, the first and second movable receiving stands 4 and 5 and the stationary receiving stand 1 have guide grooves which guide the tapes $T_1$ and $T_2$ in the direction of the arrow A and which limit the positions of the tapes $T_1$ and $T_2$ in the widthwise direction. In order to allow the tapes $T_1$ and $T_2$ to run smoothly in the direction of the arrow A, the width of each of the guide groove cannot be made equal to the width of the tapes $T_1$ and $T_2$. That is, the width of each guide groove is somewhat larger than the width of the tapes. The difference in width between the guide groove and the tapes causes the edges of the tapes to shift at the joint. Thus, the tape butt-joining accuracy is limited and it is also difficult to provide adequate tape running characteristics. Furthermore, if tapes are joined with a conventional apparatus using a very quick action, then frequently air bubbles will be trapped between the spliced tapes thereby reducing the strength of the tape at the butt-joint and decreasing the tape running characteristics.

In view of the foregoing, the inventors have conducted intensive research to provide a tape splicing method and an apparatus for practicing the method in which the tape butt-joining accuracy is remarkably improved.

Accordingly, an object of this invention is to provide a tape splicing apparatus in which all of the drawbacks accompanying a conventional tape splicing method or apparatus have been eliminated and with which tapes can be spliced with a high butt-joint accuracy with a relatively compact mechanism.

SUMMARY OF THE INVENTION

The foregoing object and other objects of the invention have been achieved by the provision of a tape splicing apparatus which according to the invention includes a drum body for feeding splicing tape in predetermined lengths toward the ends of first and second tapes to be butt-joined together with the splicing tape while retaining the non-adhesive surface of the splicing tape on the circumferential wall of the drum body by suction, driving means for turning the drum body intermittently in one direction, a tape cutting knife for cutting the splicing tape on the circumferential wall of the drum body in the widthwise direction of the splicing tape into segments of splicing tape having a predetermined length, means for depressing a part of the adhesive surface of a segment of splicing tape against the butt-joint of the first and second tape with the drum body, and a depressing roller for bonding the entire adhesive surface of the segment splicing tape, part of which has been bonded to the butt joint of the first and second tapes, to the first and second tapes thereby preventing the entrapment of air bubbles between the tapes thus bonded.

DESCRIPTION OF THE PREFERRED EMBODIMENTS

A tape splicing method and an example of an apparatus according to the invention will be described with reference to FIGS. 2 through 14 in which by way of example, a magnetic tape $T_1$ having a thickness of 20 μm and a width of 12.65 mm is spliced to a leader tape having a thickness of 40 μm and a width of 12.65 mm.

Figure 1:
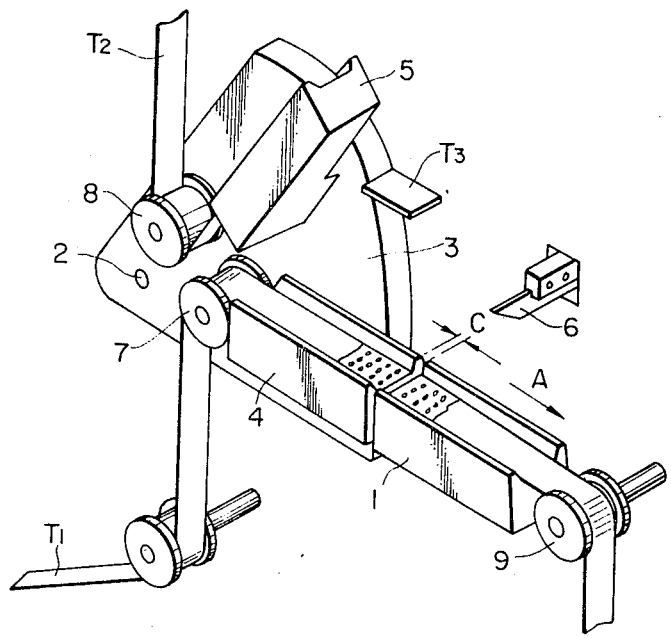
FIG. 1 is a perspective view of a conventional tape splicing apparatus.
Figure 2:
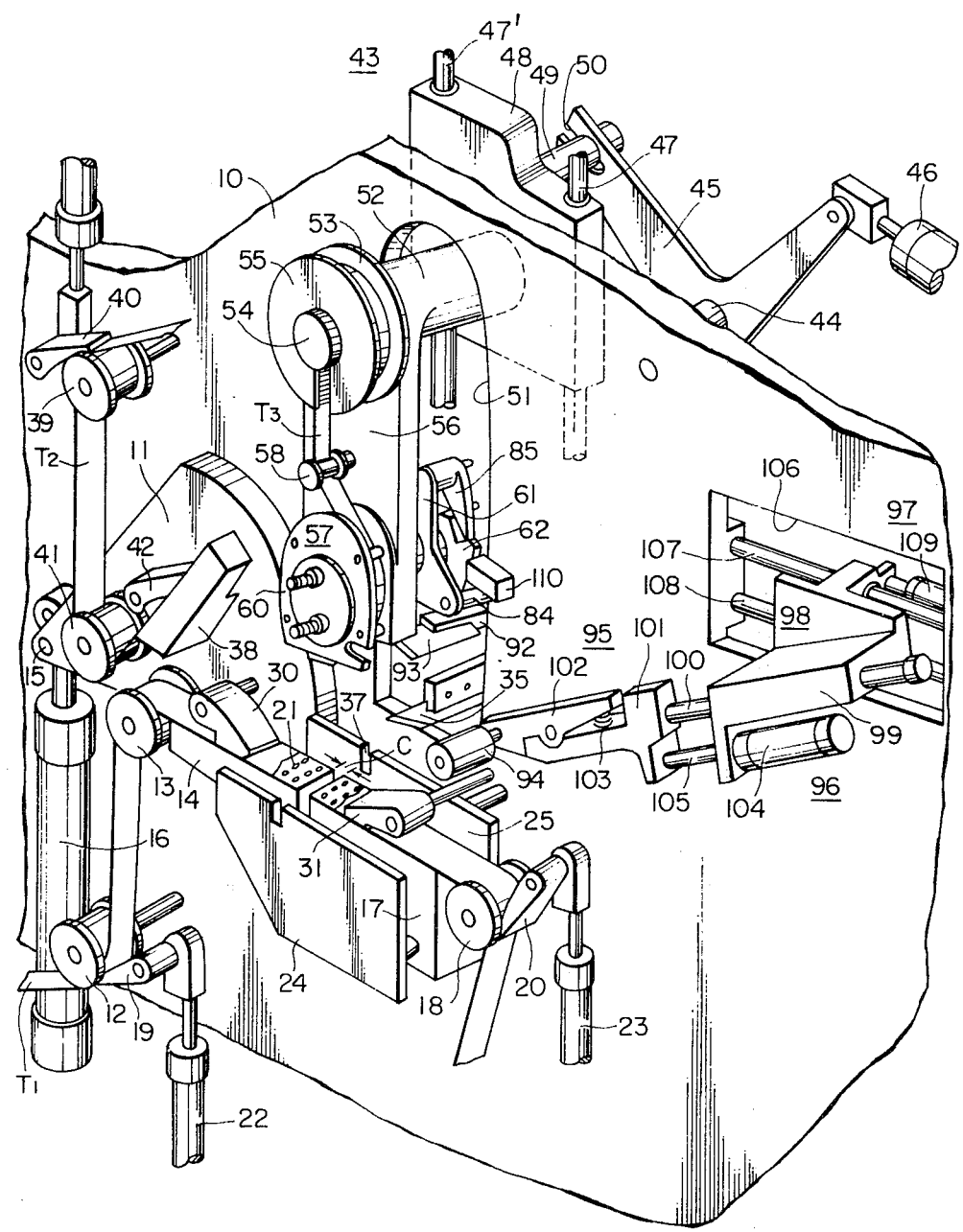
FIG. 2 is a perspective view of a tape splicing apparatus constructed according to the invention.

FIG. 2 is a perspective view showing the essential components of the apparatus of the invention. The magnetic tape $T_1$ is continuously supplied from a stock magnetic tape roll (not shown). The magnetic tape $T_1$ thus supplied is directed upwards from below by a first guide roller 12 which is rotatably supported by a shaft on the front surface of a supporting panel 10. Thereafter, the magnetic tape $T_1$ runs substantially horizontally between a first movable roller 13 and a third guide roller 18. The movable roller 13 is rotatably supported on the front surface of a sector-shaped rocking supporting plate 11 which is rocked by an actuator 16 around a supporting shaft 15 which is mounted on the front surface of the supporting panel 10. The third guide roller 18 is rotatably supported by a supporting shaft on the front surface of the supporting panel 10. Thereafter, the magnetic tape $T_1$ is guided downwardly by the guide roller 18 and is then wound on a winding core (not shown) in a winding section (not shown).

A first movable receiving stand 14 and a stationary receiving stand 17 are provided adjacent one another along the horizontal path of the magnetic tape $T_1$ between the first movable roller 13 and the third guide roller 18. The receiving stands 14 and 17 are so arranged that the upper surface thereof are set as close to the lower surface of the magnetic tape $T_1$ as possible but are in a spaced relation to the lower surface of the tape. A number of suction through-holes 21 for providing vacuum pressure for retaining the magnetic tape $T_1$ are formed in each of the flat rectangular regions which are provided on the upper surfaces of the receiving stands 14 and 17 with each flat region having a width equal to or slightly smaller than the width of the magnetic tape $T_1$.

Each of the first movable receiving stand 14 and the stationary receiving stand 17 has substantially the form of a rectangular parallelepiped block. The first movable receiving stand 14 is mounted on the front surface of the rocking supporting plate 11 in such a manner that the left end face of the receiving stand 14 is close to the first movable roller 13 and the right end face thereof is adjacent to the left end face of the stationary receiving stand 17 with a gap C therebetween which is crossed by a tape cutting knife 35 described below.

When the magnetic tape $T_1$ has been wound on the winding core to a predetermined length, the tape winding operation is suspended. Upon suspension of the winding operation, pressure is exerted on the first guide roller 12 and the third guide roller 18 through the magnetic tape $T_1$ by first and second tape depressing members 19 and 20 which are positioned near the cylindrical walls of the guide rollers 12 and 18 and are driven by actuators 22 and 23, respectively. As a result, the magnetic tape $T_1$ laid over the guide rollers 12 and 18 and stopped thereon is held in place being depressed by the tape depressing members 19 and 20.

The first tape depressing member 19 is arranged to depress the guide roller 12 eccentrically so that the tape depressing member 19 places a torque of the guide roller 12 causing it to supply or feed a segment of the magnetic tape with the aid of the actuator 22. As a result, the tension on the magnetic tape $T_1$ is released and the magnetic tape $T_1$ is brought into contact with the upper surfaces of the first movable receiving stand 14 and the stationary receiving stand 17.

Figure 3:
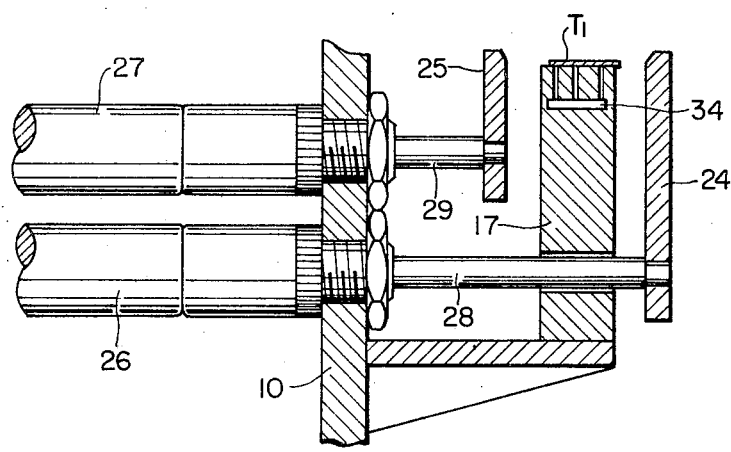
FIG. 3 is a sectional view showing a tape positioned relative to movable guide plates in FIG. 2.
Figure 4:
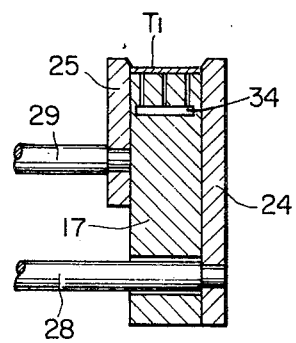
FIG. 4 is a sectional view showing a tape whose position is corrected by the movable guide plates in FIG. 2.

Thereafter, a pair of movable guide plates 24 and 25, which are provided on opposite sides of the receiving stands 14 and 17, are moved toward the front and rear surfaces of the receiving stands 14 and 17 by actuators 26 and 27, respectively. The pair of movable guide plates 24 and 25, as shown in FIG. 3, are supported by the end portions of drive shafts 28 and 29 which are reciprocated by the actuators 26 and 27, respectively. It should be noted that the drive shaft 28 penetrates the stationary receiving stand 17.

The movable guide plates 24 and 25 are held in spaced relation to the front and rear surfaces of the receiving stands 14 and 17 when not operated and therefore the magnetic tape $T_1$ on the receiving stands 14 and 17 is free to shift in the widthwise direction of the magnetic tape as shown in FIG. 3. When the movable guide plates 24 and 25 are moved toward the receiving stands 14 and 17, the magnetic tape $T_1$, the tension in which has been released as described above, is set in place by the movable guide plates 24 and 25. That is, any shift in position of the magnetic tape $T_1$ is corrected.

Then, third and fourth tape depressing members 30 and 31 provided near the upper surfaces of the receiving stands 14 and 17 are swung to locally and relatively strongly force the magnetic tape $T_1$ against the upper surfaces of the receiving stands 14 and 17.

The tape depressing members 30 and 31 are supported by supporting shafts 32 and 33, respectively. The supporting shafts 32 and 33 are coupled to actuators (not shown) in such a manner that first end portions thereof are swingable with respect to the upper surfaces of the receiving stands 14 and 17 as the second ends thereof are rotated.

Negative pressure passages 34 (FIG. 3) communicating with the suction holes 21 formed in the upper surfaces of the receiving stands 14 and 17 are coupled to a negative pressure source (not shown) to put suction on and to thus retain the magnetic tape $T_1$ on the upper surfaces of the receiving stands 14 and 17. Then, the first tape cutting knife 35 passing through the supporting panel 10 is moved into the gap C and slots 36 and 37 which are formed in alignment with the gap C in the pair of movable guide plates 24 and 25 and the tape cutting knife 35 is reciprocated to cut the magnetic tape $T_1$ in the widthwise direction.

Upon cutting of the magnetic tape $T_1$, with the magnetic tape $T_1$ maintained depressed against the first movable receiving stand 14 by the third tape depressing member 30, the rocking supporting 11 is swung clockwise so that a second movable receiving stand 38 is in alignment with the stationary receiving stand 17. The construction and function of the second movable receiving stand 38 are the same as those of the first movable receiving stand 14 except that it is mounted on the front surface of the supporting plate 11 at an angle of 30° to 60° with respect to the first movable receiving stand 14 as viewed from the supporting shaft 15. Provided upstream of the second movable receiving stand 38 are a second guide roller 39, a tape depressing member 40, a movable roller 41 and a tape depressing member 42 all of which are similar in construction and function to the first guide roller 12, the first tape depressing member 19, the first movable roller 13 and the third tape depressing member 30 of the first movable receiving stand 14 and therefore a detailed descriptions thereof will not be given.

As a result of the previous tape splicing operation, the leader tape $T_2$ has been depressed, cut, and retained on the second movable receiving stand 38. Therefore, upon switching the first movable receiving stand 14 over to the second movable receiving stand 38, the end of the leader tape $T_2$ is brought into abutment against the rear end of the magnetic tape $T_1$ without any overlap and without being shifted in the widthwise direction.

A splicing tape feeding mechanism 43 disposed above the gap C is operated to feed splicing tape $T_3$ in predetermined lengths to bond segments of the splicing tape $T_3$ to butt joint region of the magnetic tape $T_1$ and the leader tape $T_2$. The splicing tape feeding mechanism 43 includes generally a vertical drive mechanism, a splicing tape roll holding mechanism, a mechanism for feeding splicing tape in predetermined lengths (hereinafter referred to as "a splicing tape feeding system" when applicable), a splicing tape cutting system and a splicing tape depressing system. These mechanisms and their operations will now be described.

VERTICAL DRIVE MECHANISM

The vertical drive mechanism includes an L-shaped operating lever 45 which is rockable around a supporting shaft 44 on the rear surface of the supporting panel 10, an actuator 46 having an actuating rod the end of which is coupled to one end of the operating lever 45, and a movable block 48 which is moved up and down along the rear surface of the supporting panel 10 by a pair of vertical guide shafts 47 and 47'. The block 48 has a protruding engaging member 49 on its rear surface. The engaging member 49 is engaged with a U-shaped slot formed in the other end portion of the operating lever 45. Thus, the block 48 is moved up and down by operation of the actuator 46.

Splicing Tape Roll Holding Mechanism

The splicing tape roll holding mechanism includes a protrusion 52 extending from the movable block 48 through an elongated through-hole 51 formed in the supporting panel 10 extending upwardly from near the butt joint region of the magnetic tape $T_1$ and the leader tape $T_2$, a reel 53 with a single flange on one side thereof and which is rotatably supported by the end portion of the protrusion 52, and a flange disc 55 which is detachably secured to the reel 53 with a screw 54 so that a reel with two flanges on either side thereof is provided to positively hold the splicing tape roll on the winding core of the reel 53.

Splicing Tape Feeding Mechanism

This mechanism includes a supporting plate 56 which extends substantially from the end of the protrusion 52 toward the butt joint region, a feeding drum 57 which is mounted below the reel 53 on the supporting plate 56 in such a manner that its axis B is parallel to the axis A of the reel 35, and a guide roller 58 which is rotatably mounted on the supporting plate 56 between the single-flange reel 35 and the feeding drum 57. The splicing tape feeding system together with the splicing tape roll holding system is moved up and down by the vertical drive system.

Figure 5:
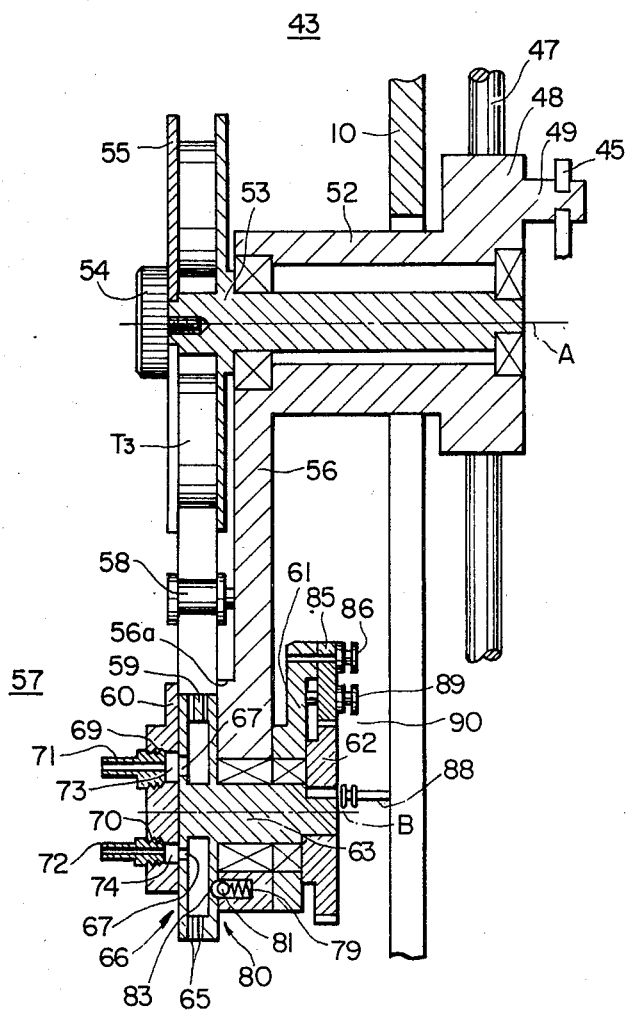
FIG. 5 is a sectional view of splicing tape feeding system in FIG. 2.
Figure 7:
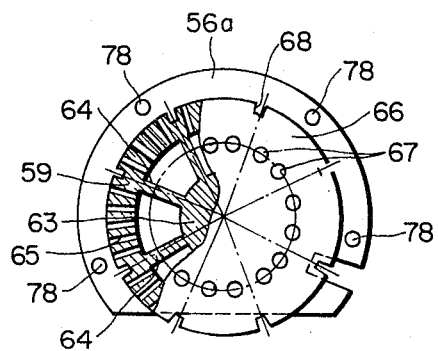

The construction of the feeding drum 57 will be described in more detail. The feeding drum 57 generally includes the following components:

3-1-1 Drum Body 59 (FIGS. 5 and 7)

The drum body 59, which has a hollow interior, is rotatably supported by bearings at the lower end portion of the supporting plate 56. The hollow interior is divided into eight chambers by partitions 64 which extend radially from the supporting shaft 64 of the drum body 59. Each of the eight chambers is relatively communicated by a switching operation with the atmosphere through a number of suction holes 65 formed in the circumferential wall thereof and is communicated with a negative pressure system and with the atmosphere, as described below, through openings 67 formed in the front end face of the drum body. The openings 67 are provided along a circle with its center at the supporting shaft and which has the same diameter.

The circumferential wall of the drum body 59 is, in its entirety, equal in width to or smaller than the splicing tape T₃. A relief groove 68 is formed at a position on the circumferential wall at the intersection of the partitions 64 and the circumferential wall. A second tape cutting knife 93 (described below) is insertable into each of the relief grooves 68 thus formed and can be reciprocated in the widthwise direction of the circumferential wall.

Figure 6:
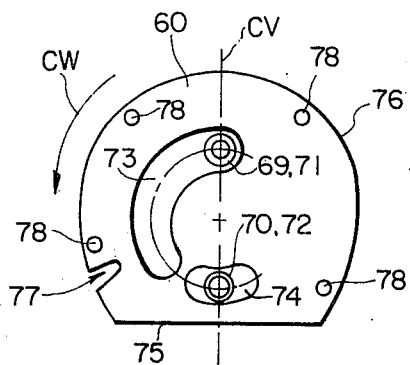
FIGS. 6, 7 and 8 are explanatory diagrams showing various members of the splicing tape feeding system in FIG. 2.

3-1-2 Cover Member 60 (FIGS. 5 and 6)

The cover member 60 is so designed that its rear surface is in sliding contact with the front end face 66 of the drum body 59 to prevent the leakage of air from the end face 66. Furthermore, the cover member 60, cooperating with the front surface 56a of the supporting plate 56, serves as a flange for the splicing tape T₃ supported on the circumferential wall of the drum body 59.

The cover member 60 has two threaded holes 69 and 70 at positions where the openings 67 cross the center line CV of the cover member 60 which is substantially perpendicular to the butt joint region described above. Upper and lower nozzles 71 and 72 are screwed into the threaded holes 69 and 70, respectively, on the front surface of the cover member 60. Furthermore, upper and lower arcuate grooves 73 and 74 are formed in the rear surface of the cover member 60 to communicate with the upper and lower nozzles 71 and 72, respectively, as shown in FIG. 6.

The upper groove 73 communicating with the upper nozzle 71 is in the form of an arc of about 130° lying along the locus of rotation of the opening 67 from the upper nozzle 71 in the direction of rotation CW of the drum body 59 and having a width somewhat larger than the diameter of the opening 67. On the other hand, the lower groove 74 communicating with the lower nozzle 72 is in the form of an arc of about 40° and has a width equal to the width of the upper groove 73, about 20° in the direction of rotation CW of the drum body 59 and about 20° in the opposite direction with the lower nozzle 72 as its center.

The cover member 60 has an upper peripheral portion 76 which is somewhat larger in radius than the drum body 59. The upper peripheral portion 76 serves as the above-mentioned flange for the splicing tape T₃. Furthermore, the cover member 60 has a lower straight peripheral portion 76 wherein at least one-eighth of the circumferential wall of the drum body 59 can protrude beyond the end portions of the cover member 60 and the supporting plate 59 so as to abut against the butt joint region of the tapes. A slot 77 is formed in the upper peripheral portion 78 at a position about 112.5° from the center line CV in the direction of the arrow CW. The slot 77 receives the above-described second tape cutting knife 93 and allows the latter 93 to reciprocate therein.

Bolt members 78 for securing the cover member 60 are rigidly coupled to the front surface 56a of the supporting plate 56. The front surface 60 is so designed that its contour is substantially similar to that of the cover member 60 and it is in sliding contact with the rear surface 80 of the drum body 59. A stopper is inserted in the lower end portion of the supporting plate 56. The stopper is made up of a spring 79 and a steel ball 81 which is biased toward the rear end face 80 of the drum body 59 so that whenever the drum body 59 is turned through 45°, the ball 81 engages a corresponding one of the recesses 83 formed in the rear end face 80 of the drum body 59 to stop the rotation of the drum body 59.

Figure 8:
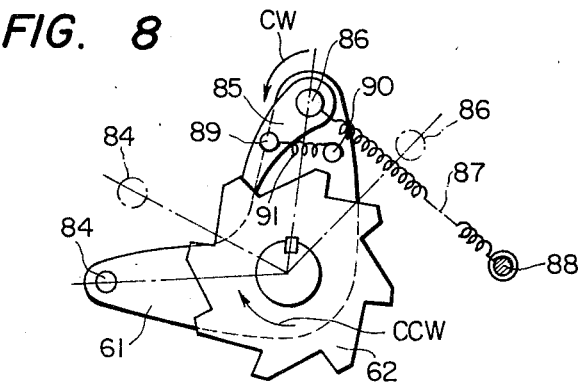

3-1-3 L-shaped Operating Lever 61 and Ratchet Wheel 62 (FIGS. 5 and 8)

The L-shaped operating lever 61 is rotatably mounted on the rear end portion of the supporting shaft 63 of the drum body 59. A locking pin 84 is rigidly attached at one end of the L-shaped operating lever 61 and a locking pawl 85 is rotatably mounted on a supporting shaft 86. The locking pawl 85 is provided to prevent rotation in the direction of the arrow CCW of the ratchet wheel 62.

One end of a spring 87 is connected to the end portion of the supporting shaft 86 of the locking pawl 85 which biases the operating lever 61 in the direction (CCW) opposite to the direction of rotation of the drum body 59. The other end of the spring 87 is connected to a pin 88 rigidly coupled to the supporting panel 10.

The locking pawl 85 is biased in the direction CW by a coil spring 91 which is connected under tension between the pins 89 and 90 which are rigidly coupled to one side of the locking pawl 85 and the other end portion of the L-shaped operation lever 61, respectively.

4. Splicing Tape Cutting Mechanism

The splicing tape cutting mechanism is retracted behind the through-hole 51 of the supporting panel 10 when it is in a standby state. When the mechanism is in operation, the second tape cutting knife 92, which is secured to the end of the rod (not shown) of its actuator (not shown), is extended forwardly through the through-hole 51 and is then reciprocated along the relief groove 68 and the slot 77.

Figure 9:
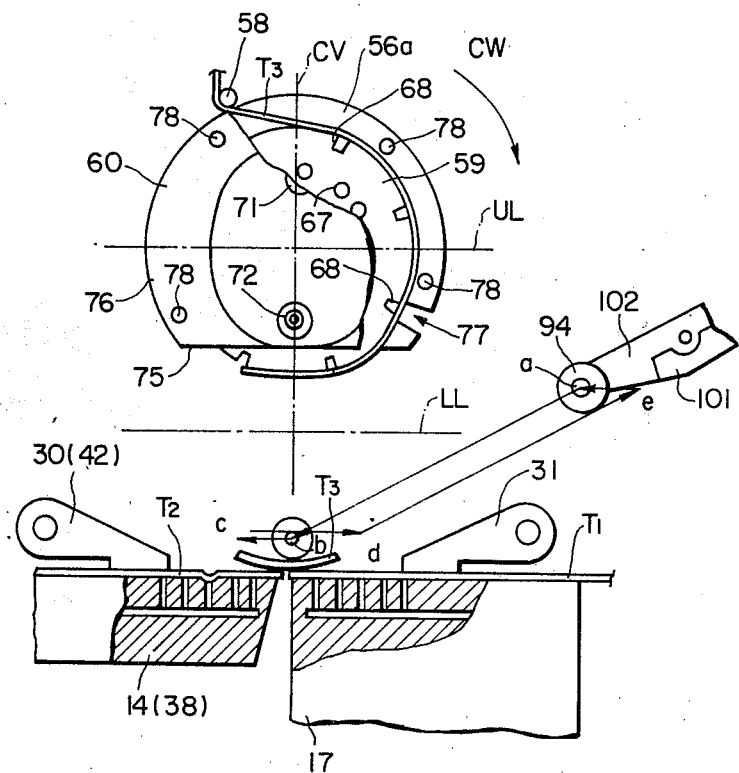
FIGS. 9 and 10 are explanatory diagrams for a description of a series of operations relating to the splicing tape feeding system in FIG. 2.

5. Splicing Tape Depressing Mechanism (FIGS. 2 and 9)

The splicing tape depressing mechanism includes a depressing roller 95, an arm 95 supporting the depressing roller 94, a driving mechanism 96 for driving the roller 94 obliquely, and a driving mechanism 97 for driving the roller 94 horizontally. The depressing roller 94 is movable from an original point a at the upper right on the supporting panel 10 obliquely downwards to the butt joint region b and is movable horizontally from the butt joint region b to a leftward position c and then to a rightward position d. Furthermore, the depressing roller 94 is movable from the rightward position d obliquely upwardly to the position e and then horizontally to the original point a.

The construction of the depressing roller mechanism will be described in more detail.

5-1 Depressing Roller 94

The depressing roller 94 is rotatably mounted on a shaft provided on a rocking arm 102 forming a part of the supporting arm 95. The depressing surface of the depressing roller 94 is made of an elastic rubber material having a width substantially equal to the width of each of the tapes T₁, T₂ and T₃.

5-2 Supporting Arm 95

The supporting arm 95 is made up of a stationary arm 101 and the rocking arm 102 which is rockably supported on the stationary arm 101. The stationary arm 101 is fixedly secured to the lower end of the guide shaft 100 which can freely go in and out of the protruding block 99 of a slider 98 (described below) which protrudes from the front surface of the supporting panel 10.

The arms 101 and 102 extend from the lever end of the guide shaft 100. The guide shaft 100 is inclined toward the butt joint region as viewed in FIG. 2. The depressing roller 94 mounted on the end of the rocking arm 102 is elastically movable horizontally as indicated by b, c and d by a coil spring disposed between the lower surface of the rear end portion of the rocking arm 102 and the upper surface of the stationary arm 101.

5-3 Depressing Roller 94 and Oblique Driving Member 96

The obliquely driving member 96 includes an actuator 104 which is secured to the protruding block 99 below the guide shaft 100 and parallel to the guide shaft 100. The rod 105 of the actuator 104 is coupled to the stationary arm 101.

5-4 Depressing Roller 94 Horizontal Driving Member 97

The horizontal driving member 97 includes the slider 98 which is moved horizontally guided by guide shafts 107 and 108 which are disposed parallel to one another in a horizontally extending through-hole 106 formed in the upper right portion of the supporting panel 10 and an actuator 109 the end of the rod of which is connected to the slider 98.

Figure 10:
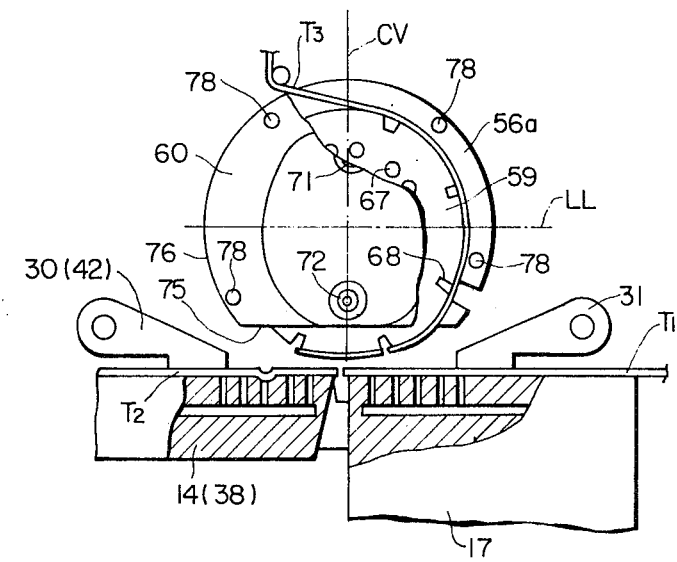

When the rear end of the magnetic tape $T_1$ on the stationary receiving stand 17 and the top end of the leader tape $T_3$ on the movable receiving stand 38 are butted against each other without overlap and without any shift in the widthwise direction, the splicing tape roll holding system and the splicing tape feeding system are moved from the upper limit UL or stand-by position as shown in FIG. 9 downwardly to the lower limit LL or splicing position as shown in FIG. 10 by operation of the actuator 46.

The splicing tape $T_3$ is retained by suction on the circumferential wall of the drum body 59 over a predetermined winding angle by means of the nozzles 71 and 72 and the grooves 73 and 74 which are communicated with the negative pressure source. In the previous vertical drive operation, the drum body 59 has been turned through 45° in the direction of the arrow CW and the tape newly fed to a length corresponding to one-eighth of the circumference of the drum body 59 from the tape roll on the reel 53. While the drum body 59 is held at the upper limit UL awaiting the next downward movement, the tape cutting knife 93 is reciprocated along the slot 77 and a relief groove 68 corresponding to the slot 77 to cut from the splicing tape $T_3$ retained on the circumferential wall of the drum 59 a segment of splicing tape of predetermined length.

The splicing tape $T_3$ on the drum body 59 is cut with the above-described timing whenever the slot 77 coincides with a relief groove 68, that is, whenever the drum body 59 is turned through 45°. That is, the splicing tape $T_3$ is cut between adjacent grooves 68 into segments of tape $T_3$ each equal in length to one-eighth of the circumference of the drum body 59 and retained on the circumferential wall of the drum body 59 by the negative pressure applied through the suction holes 65 from the hollow interior of the drum body.

When the drum body 59 is lowered from its upper limit UL toward the lower limit LL, the locking pin 84 of the operating lever 61, which, when the drum body 59 is at the upper limit UL, abuts against the lower surface of a stopper 110 mounted on the supporting panel 10 with its end portion protruding into the vertically elongated through-hole 51, is held in abutment with the lower surface of the stopper 110 by the force in the direction of the arrow CCW of the coil spring 87. Therefore, the position of the locking pin 84 relative to the supporting shaft 63 being lowered changes. That is, a positional relation is established as if it were turned to a position indicated by the broken line in FIG. 8.

At the same time, the supporting shaft of the locking pawl is displaced in the same direction and at the same angle as the locking pin 84. Accordingly, the end portion of the locking pawl 85 is disengaged from the gear tooth of the ratchet wheel 62 with which the end portion has been engaged while simultaneously the locking pawl 85 is rocked in the direction of the arrow CW by the force of the coil spring 91. Accordingly, with the displacement angle of the operating lever 61 set to one pitch, that is, gear tooth interval, of the gear of the ratchet wheel 62, the locking pawl will engage with the next tooth of the gear.

While the locking pawl 85 is being disengaged from and engaged with the ratchet wheel 62, the rotation of the drum body 59 is stopped by the steel ball 81 engaged with the recess 83. Therefore, because the relative position of each gear tooth of the ratchet wheel 62 and the supporting shaft 63 is established so that the center of each of eight arcs obtained by equally dividing the circumference of the drum body 59 coincides with the center line CV, each segment of splicing tape $T_3$ has a length equal to one-eighth of the circumference of the body drum. The segments of splicing tape $T_3$ can be evenly bonded to the upper surfaces of the tapes $T_1$ and $T_2$ with the butt joint b at the center.

When the drum body 59 reaches the lower limit LL as shown in FIG. 10, the hollow interior at the lowest position which has been communicated with the negative pressure source is automatically communicated through the lower nozzle 72 to the atmosphere for a predetermined period of time as a result of which the segment of splicing $T_3$ is released from the circumferential wall of the drum body.

The released segment of splicing tape $T_3$ often remains curled. Accordingly, it is frequently observed that only that portion of the splicing tape segment which corresponds to the butt joint b is stuck to the abutted tapes with the remaining portion is left curled upwardly. In order to overcome this difficulty, the above-described depressing roller 94 is employed. That is, when the drum body 59 is returned to its upper limit UL, the depressing roller 94 is moved along the locus of a→b→c→d→e→a indicated with the arrows so that the segment of splicing tape $T_3$ is positively and uniformly bonded to the tapes $T_1$ and $T_2$. It is evident that the depressing roller 94 is moved along the above-described locus by sequentially operating the oblique driving member 96 and the horizontal driving member 97.

As the drum is moved from its lower limit LL to the upper limit UL, the relative positions of the locking pin 84 abutted against the stopper 110 and the supporting shaft 63 are established as if the locking pin 84 had been turned in the direction of rotation CW of the drum body 59 with respect to the supporting shaft 63. That is, the locking pin 84 is returned to the original position indicated by the solid line. Accordingly, at the same time, the locking pawl 85 is also returned to the original position indicated by the solid line from the position indicated by the broken line.

In association with the return of the locking pawl 85 to its original position, the next gear tooth of the ratchet wheel 62 engaging with the end portion of the locking pawl 85 is turned in the CW direction of rotation with respect to the drum body 59 by one pitch and therefore the drum body 59 is rotated through a one-eighth turn in the direction of the arrow CW by the supporting shaft 63.

When the segment of splicing tape $T_3$ has been completely bonded to the butt joint region b of the tapes $T_1$ and $T_2$, the second tape depressing members 40, 42, 31 and 20 are swung away from the leader tape $T_2$ and the magnetic tape $T_1$ and the pair of guide plates 24 and 25 are moved away from the receiving stands 78 and 17.

Furthermore, the suction holes 21 of the second movable receiving stand 38 and the stationary receiving stand 17 are communicated with the atmosphere to eliminate the suction and hence retention of the tapes $T_1$ and $T_2$ so that winding the leader tape $T_2$ along with the magnetic tape $T_1$ can be accomplished.

When the leader tape $T_2$ is fed from the stock leader tape roll (not shown) to the predetermined length, the winding operation is again suspended. The tape depressing members 20 and 40 depress the leader tape $T_2$ against the second and third guide rollers 39 and 18 to release the tension on the leader tape $T_2$ laid over the second movable roller 41 and the third guide roller 18. Thereafter, the pair of movable guide plates 24 and 25 and the tape depressing members 42 and 31 are successively operated and negative pressure again is established in the suction holes 21 so as to retain the leader tape $T_2$ in place on the upper surfaces of the receiving stands 38 and 17. The leader tape $T_2$ thus held is cut with the first tape cutting knife 35.

Thereafter, the magnetic tape $T_1$ held on the upper surface of the first movable receiving stand 14 can be butt-joined to the leader tape $T_2$ held on the stationary receiving stand 17 by operating the various members in accordance with the above-described operation after the rocking supporting plate 11 is swung counterclockwise to move the first movable receiving stand 14 into position adjacent the stationary receiving stand 17.

Figure 11:
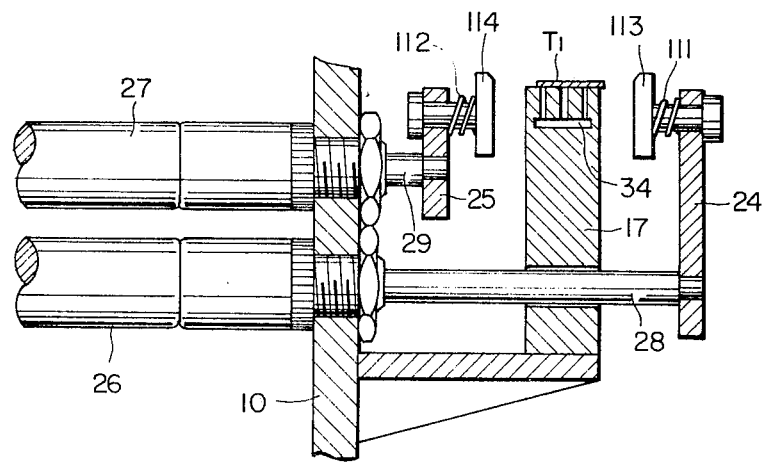
FIGS. 11 and 12 are sectional views of a modification of the movable guide plates in FIGS. 3 and 4.
Figure 12:
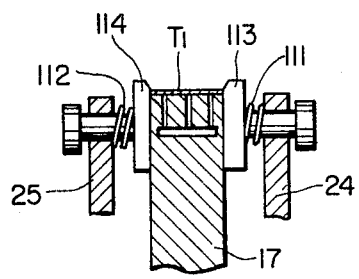

If auxiliary guide plates 113 and 114 are provided for the pair of movable guide plates 24 and 25, respectively, in such a manner that, as shown in FIGS. 11 and 12, the guide plates 113 and 114 are biased toward the front and rear surfaces of the first movable receiving stand 14 or the second movable receiving stand 38 and the stationary receiving stand 17 by the relatively weak elastic forces of springs 111 and 112 positioned inside the movable guide plates 24 and 25, the tapes can be more positively brought into close contact with the receiving stands and can be positioned with a higher accuracy in the widthwise direction.

Figure 13:
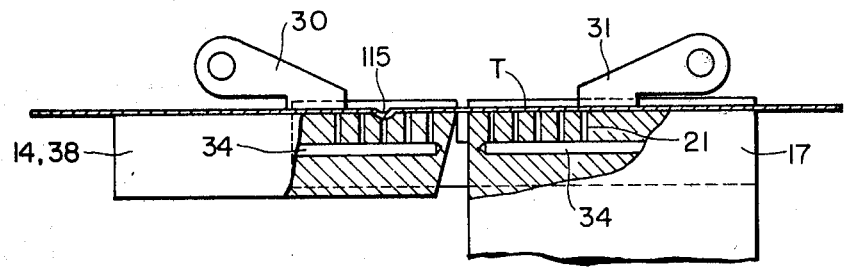
FIGS. 13 and 14 are explanatory diagrams showing a tape on the movable receiving stand in FIG. 2 before and after being cut.
Figure 14:
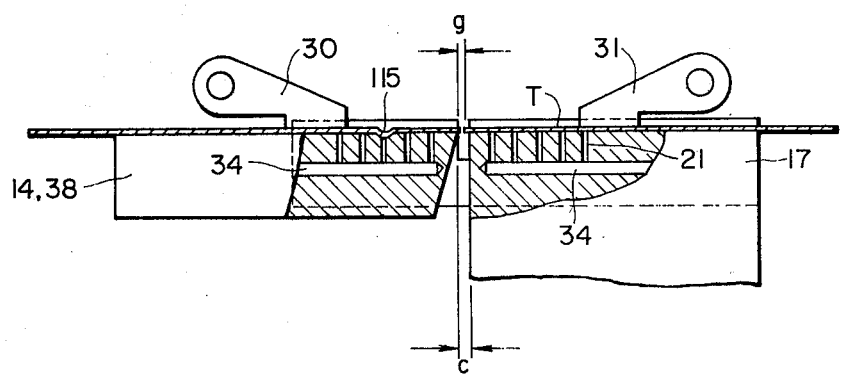

If a butt joint gap longitudinally of the tapes is permitted within a predetermined range or the gap is provided positively in order to prevent the occurrence of overlap of the tapes $T_1$ and $T_2$, a transverse groove 115 can be cut in the upper surface of the first or second movable receiving stand 14 or 38 and between the depressing end portion of the tape depressing members 30 and 40 and the gap C parallel to the tape cutting direction as shown in FIGS. 13 and 14. In this case, in the course of placing suction on the tape, a part of the tape T laid over the transverse groove 115 is pulled into the transverse groove 115 by the negative pressure in the suction holes 21 communicating with the transverse groove 115 as a result of which tension is imparted to the tape T between the tape depressing member 30 or 42 and the tape depressing member 31.

When, under this condition, the tape is cut, the tape tension is released, and the tapes separated by the cutting operation contract by an amount determined by the elastic deformation of the tape as a result of which they move apart from each other thus providing the desired gap g.

The tension on the tape T due to the negative pressure in the transverse groove 115 can be adjusted as desired by changing dimensional data such as the depth and width of the transverse groove 115 or the number of transverse grooves. However, it is desirable that the transverse groove 115 be semicircular in cross section so that, when the tape T is cut and separated, the separated tapes can be moved smoothly.

The various members for splicing the magnetic tape $T_1$ and the leader tape $T_2$ are automatically operated by respective detection circuits and control circuits (not shown) and therefore splicing of tapes can be achieved in a very short time (usually in five seconds).

In the above-described embodiment of the invention, the circumferential wall of the drum body 57 is divided into eight equal parts. However, it should be noted that the invention is not limited thereto or thereby. That is, the circumferential wall may be divided into a different number of equal parts depending on the desired length of splicing tape $T_3$ to be fed. In addition, the drum body may be provided with a regular polygonal wall instead of the above-described circular wall.

Furthermore, the apparatus of the invention may be so modified that the splicing tape roll holding system is separated from the vertical driving system and only the splicing tape feeding system is moved vertically by the vertically moving system or actuator.

With the apparatus of the invention, the magnetic tape $T_1$ can be butt-joined to the leader tape $T_2$ positively in a relatively short time. The segment of splicing tape $T_3$ retained on the circumferential wall of the drum body 59 is pressed against the butt-joint b in line contact or with a minimum contact area and thereafter the splicing tape $T_3$ is completely bonded to the tapes $T_1$ and $T_2$ by moving the depressing roller 94 horizontally over the tapes. Therefore, the invention completely prevents the difficulty that air is entrapped between the bonded tapes.

While the invention has been described with reference to the case where a magnetic tape $T_1$ is butt-joined to a leader tape $T_2$, the invention is also applicable to butt-joining magnetic tapes $T_1$ successively or to butt-joining tapes other than magnetic tapes $T_1$ and leader tapes such as photographing films or paper tapes.

What is claimed is:

1. A tape splicing apparatus comprising:
    a drum body for feeding splicing tape toward the ends of first and second tapes to be butt-joined with said splicing tape and having means for retaining a non-adhesive surface of said splicing tape on the circumferential wall of said drum body;
    driving means for turning said drum body intermittently in one direction;
    a tape cutting knife for cutting said splicing tape on the circumferential wall of said drum body in the widthwise direction of said splicing tape into segments of splicing tape having a predetermined length;
    means for depressing a part of the adhesive surface of a segment of splicing tape against the butt-joint of said first and second tape with said drum body; and
    depressing roller means for bonding the entire adhesive surface of said segment of splicing tape to said first and second tapes while preventing the formation of air bubbles between said tapes thus bonded.

2. The tape splicing apparatus of claim 1 wherein said drum body has a hollow interior divided into a plurality of chambers by partitions extending radially from a supporting shaft at the center of said drum body and said drum body has a plurality of suction holes formed in the circumferential wall of said drum body extending into said chambers.

3. The tape splicing apparatus of claim 2 wherein said circumferential wall of said drum body is circular.

4. The tape splicing apparatus of claim 2 wherein said circumferential wall of said drum body is polygonal.

5. The tape splicing apparatus of claim 2 wherein said drum body is provided with relief grooves formed at positions upon said circumferential wall at the intersection of said partitions and said circumferential wall, said tape cutting knife being insertable into each of said relief grooves at a predetermined rotational position of said drum body.

6. The tape splicing apparatus of claim 2 wherein said drum body is provided with a plurality of recesses, one of said recesses being provided for each of said partitions, and further comprising a stopper member including a spring and a ball biased towards said recesses functioning as a detent member for retaining the rotational position of said drum body at predetermined positions.

7. The tape splicing apparatus of claim 2 further comprising a cover member disposed in sliding contact with a front end face of said drum body to prevent the leakage of air from said end face and to serve as a flange for splicing tape supported on said circumferential wall of said drum body.

8. The tape splicing apparatus of claim 7 wherein said cover member is provided on an inner surface thereof with upper and lower arcuate grooves and further comprising upper and lower nozzles communicating, respectively, with said upper and lower arcuate grooves.

9. The tape splicing apparatus of claim 7 wherein said cover member has a generally circular upper portion and has a cut-off lower edge beyond which projects a portion of said drum body.

10. The tape splicing apparatus of claim 1 wherein said driving means comprises a L-shaped operating lever rotatably mounted on a rear end portion of said shaft of said drum body, a locking pin rigidly coupled to one end of said L-shaped operating lever, a locking pawl and a supporting shaft for said locking pawl, a spring biasing said operating lever in the rotational direction opposite to that of said drum body, and a ratchet wheel mounted upon said shaft, said locking pawl interacting with the teeth of said ratchet wheel to prevent rotation thereof in said rotational direction opposite that of said drum body.

11. The tape splicing apparatus of claim 1 wherein said depressing means comprises a vertical drive mechanism for moving said drum body in a vertical direction towards and away from a splicing position, said vertical drive mechanism comprising an L-shaped operating lever rotatably mounted upon a supporting shaft rigidly coupled to a rear surface of a supporting panel, an actuator having an actuating rod coupled to one end of said operating lever, and a movable block slidably mounted upon a pair of vertical guide shafts and having an engaging member operatively engaged with the other end of said operating lever wherein said movable block is moved up and down by movement of said operating lever, a protrusion rigidly coupled to said movable block extending through a vertically extending aperture in said supporting panel, and a supporting plate rigidly coupled to said protrusion, said shaft of said drum body being rotatably mounted by said supporting plate.

12. The tape splicing apparatus of claim 11 further comprising means for mounting a reel of splicing tape, said mounting means being attached to said supporting plate above said drum body.

13. The tape splicing apparatus of claim 1 wherein said depressing roller means comprises a stationary arm, a locking arm lockably supported upon said stationary arm, a roller rotatably attached to an outward end of said locking arm, first and second horizontally oriented guide shafts rigidly coupled to said supporting panel, a slider slidably disposed upon said horizontal guide shafts, a block rigidly coupled to said slider, a guide shaft rigidly coupled to said stationary arm and slidably disposed through said protruding block, a first actuator rigidly coupled to said block and having an actuator arm coupled to obliquely move said stationary arm, and a second actuator for moving said slider along said horizontal guide shaft.

14. The tape splicing apparatus of claim 1 further comprising first and second movable receiving stands, said first and second movable receiving stands being mounted upon a front surface of a rocking supporting plate wherein either of said first or second movable receiving stands can be swung into a horizontal position, said first and second movable receiving stands being adapted to hold a tape on and upper surface thereof and said first and second movable receiving stands having a plurality of suction holes in said upper surfaces thereof coupled to a source of negative pressure.

15. The tape splicing apparatus of claim 14 wherein each of said first and second movable receiving stands are provided with a tape depressing member swingably mounted to said locking supporting plate.

16. The tape splicing apparatus of claim 14 further comprising a stationary receiving stand rigidly coupled to said supporting plate, said stationary receiving stand having a plurality of suction apertures in an upper surface thereof connected to a source of negative pressure and a tape depressing member provided for pressing tape against said upper surface of said stationary receiving stand.

17. The tape splicing apparatus of any of claims 14–16 further comprising a pair of movable guide plates disposed upon opposite sides of said stationary receiving stand and the position of said movable receiving stand adjacent said stationary moving stand, a pair of drive shafts supporting said guide plates and a pair of actuators coupled to corresponding ones of said drive shafts for moving said guide plates towards and away from said receiving stands.

18. The tape splicing apparatus of claim 14 further comprising a pair of auxiliary guide plates, one of said auxiliary guide plates being mounted upon one of said movable guide plates and being spring biased towards the front and rear surfaces of said movable receiving stands and said stationary receiving stands.

19. The tape splicing apparatus of claim 14 wherein said upper surface of each of said movable receiving stands is provided with a groove extending perpendicular to the direction of movement of tape.

* * * * *